April 4, 1967 W. J. MATTOX ETAL 3,312,602
SEPARATION OF LINEAR ALIPHATIC MONO-OLEFINS FROM
HYDROCARBONS BY DISTILLING WITH A NITRILE
Filed Aug. 29, 1963
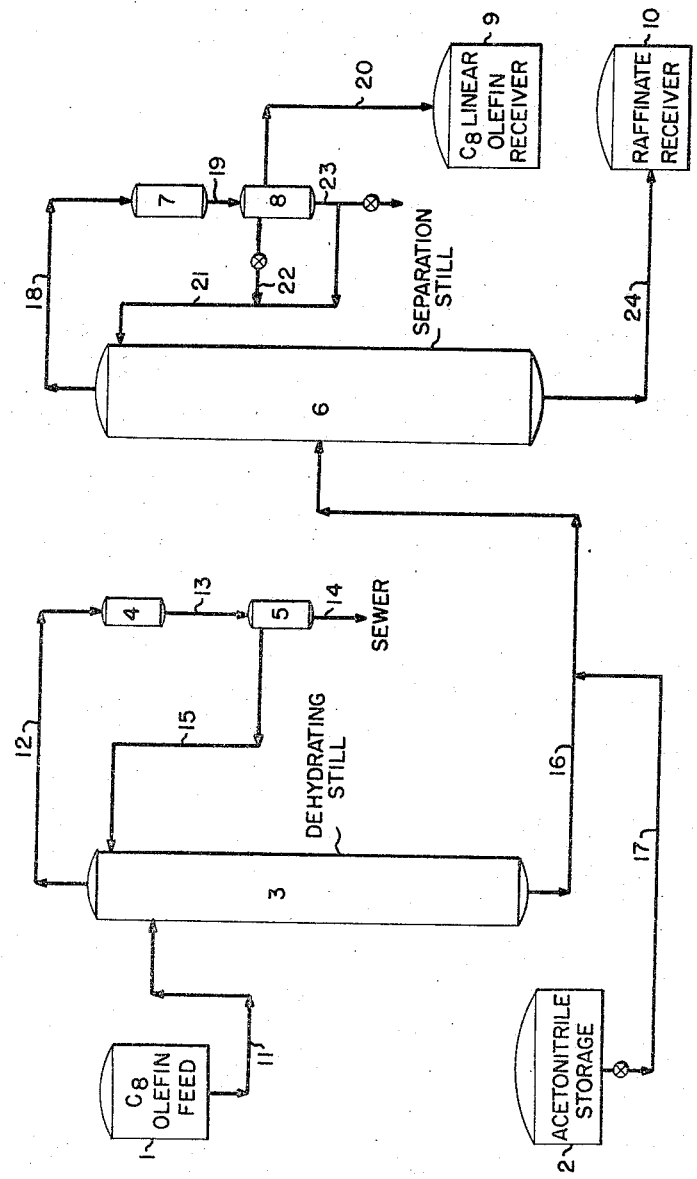
William Judson Mattox
Glen Porter Hamner    Inventors
By C B Harris
Patent Attorney United States Patent Office 3,312,602
Patented Apr. 4, 1967

3,312,602
SEPARATION OF LINEAR ALIPHATIC MONO-OLEFINS FROM HYDROCARBONS BY DISTILLING WITH A NITRILE
William Judson Mattox and Glen Porter Hamner, Baton Rouge, La., assignors to Esso Research and Engineering Company, a corporation of Delaware
Filed Aug. 29, 1963, Ser. No. 305,397
11 Claims. (Cl. 203—53)

This invention relates to the separation of hydrocarbons by means of distillation. More particularly it relates to a process for the separation of linear aliphatic olefins from a mixture thereof with branched and cyclic mono-olefins, diolefins, and aromatics by azeotropic distillation using certain nitriles as a vapor entrainer.

At the present time there is a great amount of interest in the technical art with respect to the production of linear olefins. In such production there are two principal routes to the linear olefins, viz., aluminum alkyl growth and wax cracking. It is with the latter method that the instant invention is concerned. Heretofore, it has been found, however, that the quality of such wax cracked olefins is inferior to the growth olefins. Inasmuch as olefin quality is directly related to the quality of the wax feed and to the cracking severity, diolefins, both conjugated and non-conjugated, are generally inherent at practical cracking severity levels. Further, aromatics and cyclic mono-olefins, resulting from cyclic structures in the wax feed, are also present. Hence, the problem of purifying wax cracked olefins is found to be difficult in that it is necessary to remove impurities which are isomers and have boiling points which are similar to the desired product. The usual methods of separation employed, such as extractive distillation, solvent extraction, and adsorption are either inoperable, economically prohibitive, or of poor efficiency when olefins of relatively long chain length, e.g., six or more carbon atoms, are employed.

It is an object of the present invention therefore to provide a process for the separation of linear aliphatic olefins from a mixture thereof with branched and cyclic mono-olefins, diolefins, and aromatics.

Another object of the present invention is to provide a process for separating $C_6$–$C_{20}$ linear aliphatic olefins from a mixture thereof with branched and cyclic mono-olefins, diolefins and aromatics of similar boiling points by distillation methods.

Still another object of the present invention is to provide such a process which is economically feasible and will achieve a degree of purification of wax cracked olefins which is at least the equal of the purity of alkyl growth olefins.

Still other objects and advantages of the present invention will be realized from the following disclosure.

The present invention provides a means of separating linear aliphatic olefins from mixtures thereof with corresponding branched and cyclic mono-olefins, diolefins, and aromatics by distilling said mixture with a nitrile of the general formula $R(CN)_n$ wherein $n$ is 1 or 2 and R is an aliphatic hydrocarbon radical or an aliphatic hydrocarbon radical in which part of the hydrogen has been replaced with a substituent group containing oxygen, halogen, or nitrogen, or other substituent groups containing one or more of these elements, said nitrile being employed as an azeotrope entrainer, distilling off an azeotrope comprising a linear aliphatic olefin-nitrile heterogenous azeotrope, and removing the linear aliphatic olefin fraction from said entrainer. Examples of the nitrile substituent groups referred to above include hydroxyl, carbonyl, oxy, imino, and amino radicals and fluorine and chlorine atoms.

While the process of the present invention is applicable to any mixture of linear aliphatic olefins with branched and cyclic mono-olefins, diolefins, and aromatics, the mixtures shown herein are by-products of wax cracked petrolatum feedstocks. This is merely illustrative and not intended in any way to limit or restrict this invention. It must be pointed out, however, that in view of the general inferiority of the quality of wax cracked olefins as hereinbefore mentioned, the fact that such wax cracked olefins are effectively purified is an outstanding advantage of the present process. Thus, the present invention is preferably applicable to mixtures of hydrocarbons having from 6 to 20 carbon atoms, and especially applicable to mixtures of hydrocarbons having from 7 to 16 carbon atoms, regardless of the source of the mixture.

The difficulties involved in obtaining an efficient separation of the above discussed mixtures will be realized by a consideration of the boiling points of each of the components of one of the mixtures in question. For example, at standard atmospheric pressure representative components boiling in the range of a $C_8$ wax cracked olefin have normal boiling points as presented in the following tabulation:

| Component: | Boiling point, ° F. |
|---|---|
| Octene-1 | 248.5 |
| 1,3-dimethylcyclohexene | 255–259 |
| 4,4-dimethylcyclohexene | 248–252 |
| 2,4-dimethylcyclohexene | 264 |
| 3,3-dimethylcyclohexene | 246 |
| 1,4-octadiene | 232.2 |
| 1,5-octadiene | 248 |
| 1,7-octadiene | 243 |
| 2,6-octadiene | 256.1 |
| 2,5-dimethyl-2,3-hexadiene | 246–253 |
| 4-ethyl-1,4-hexadiene | 252.1 |
| Ethylbenzene | 277.1 |

The separation is, however, even more difficult than would be anticipated even in view of the above close boiling points, inasmuch as constant-boiling mixtures are often formed between components of the mixture.

It is easily recognizable, therefore, that the choice of the proper nitrile entraining agent employed in the process is a critical feature of the present invention. The choice of entraining agent is important primarily with regard to its ability to form a practical nitrile-linear aliphatic olefin azeotrope. Further, the nitrile-linear mono-olefin azeotrope will preferably have a boiling point below that of the linear mono-olefin per se or the mixture or fraction from which such olefin is to be separated. In addition, the relative miscibility of the nitrile is important in permitting entrainer recovery by simple means. Hence, it is preferable that the nitrile will also be at least partially immiscible with the product mono-olefin at or about ambient temperatures so that upon the cooling and condensation of the distillate a phase separation will be effected which yields essentially a nitrile layer and a hydrocarbon layer. Upon such separation, the nitrile layer is then suitable for recycle.

Accordingly it has been found that certain aliphatic nitriles possess the above qualities which mark their utility as entraining agents in the distillation of the closely boiling hydrocarbon components of the present invention. Broadly, these nitriles have the general formula:

wherein $n$ is 1 or 2 and R is a hydrocarbon radical having from 1 to 4 carbon atoms or a hydrocarbon radical having from 1 to 4 carbon atoms in which part of the hydrogen has been replaced with oxygen, halogen, or nitrogen or other substituent groups containing one or more of these elements. Examples of the nitrile substituent groups referred to above include hydroxyl, carbonyl, oxy, imino, and amino radicals and fluorine and chlorine atoms. Suitably, from 0.1 to 10 volumes of nitrile entraining agent are employed per volume of total feed mixture with 0.2 to 4 volumes of nitrile being preferably employed. The following are illustrative, but non-limiting examples of nitriles suitable for use in olefin purification process of the present invention.

| Entraining agent: | Boiling point, ° F. |
|---|---|
| Acetonitrile | 179 |
| Propionitrile | 207 |
| Butyronitrile | 244 |
| Isobutyronitrile | 219 |
| 2-butenenitrile | 244–246 |
| 3-butenenitrile | 246.0 |
| Methoxyacetonitrile | 248 |
| Malononitrile | 428 |
| Succinonitrile | 512 |
| Fluoroacetonitrile | 176 |
| Chloroacetonitrile | 259 |
| Trichloroacetonitrile | 187 |
| 3-chloropropionitrile | 352 |
| 3-ethoxypropionitrile | 343 |
| Iso-propoxypionitrile | 374 |
| 3-chlorobutyronitrile | 386 |
| 3-hydroxypropionitrile | 442 |
| 2-chloro-2-methylpropionitrile | 241 |

As hereinbefore stated, the nitrile-linear mono-olefin azeotrope will preferably have a boiling point below that of the linear mono-olefin per se or the mixture from which the mono-olefin is to be separated. By suitable choice of nitrile, therefore, an azeotrope of sufficiently low boiling point can be obtained with the mono-olefins to permit their separation from the herein undesirable hydrocarbons, i.e., branched and cyclic mono-olefins, diolefins, and aromatics in conventional distillation type equipment.

The preferred nitriles are the lower members of the acetonitrile series and the lower homologues of such series having up to about 4 carbon atoms in the chain. It has been found that with regard to the lighter linear monoolefins, e.g. $C_6$–$C_8$ linear mono-olefins, that acetonitrile itself is particularly advantageous as an entraining agent in that it displays an effectiveness markedly above its homologues. With regard to the heavier linear mono-olefins, e.g. $C_9$–$C_{20}$ linear mono-olefins, it is found that another group of nitriles is preferred, these nitriles being the chlorinated and hydroxylated lower nitriles and derivatives containing up to about 4 carbon atoms. Monochloroacetonitrile, especially with $C_9$–$C_{12}$ linear mono-olefins, and 3-hydroxypropionitrile, especially with $C_{12}$–$C_{20}$ linear mono-olefins, have been found to possess surprising superiority. Similarly it has been found that with the $C_{16}$–$C_{20}$ linear mono-olefins, malononitrile and succinonitrile are preferred entraining agents.

The nitrile entraining agents of the instant invention may be used alone or in multicomponent mixtures of suitable nitriles. In addition, it is sometimes preferred to form ternary azeotropes in the linear mono-olefin purification distillation by employing a second or additional component in conjunction with the nitrile. Illustrative of suitable components which azeotrope with the feed to be purified and some of the nitriles are: alcohols, ketones, esters, ethers halogenated hydrocarbons, water, and the like. Illustrative of such a ternary azeotrope is a crude $C_8$ olefin-water-acetonitrile azeotrope.

The preferred form of the invention involves its application to a continuous process and such form is illustrative in the FIGURE. For purposes of illustration, a $C_8$ olefin cut is employed as feed and acetonitrile is employed as entraining agent.

Referring to the figure, the $C_8$ olefin cut, most probably obtained from the steam cracking of petrolatum, consisting of a mixture of linear mono-olefins, cyclic mono-olefins, conjugated diolefins, non-conjugated diolefins, and aromatics is fed from storage tank 1 through line 11 preferably to dehydrating still 3. The base of this continuous column is conventionally heated which results in the removal of hydrocarbon-water azeotropes through vapor lines 12 and condenser 4 to decanter 5. After phase separation the water layer is removed through line 14 and the upper hydrocarbon layer is returned to reflux through line 15 to dehydrating still 3. The dehydrated olefinic feed is removed from the base of the still through line 16 and is fed through line 16 to separation still 6. In this column, the olefinic feed mixture is contacted with from 1.2 to 1.8 volumes of acetonitrile per volume of feed, said acetonitrile having been previously pumped into the column from acetonitrile storage tank 2 through lines 17 and 16. The more volatile acetonitrile-linear mono-olefin azeotropes are removed from the top of the column through vapor line 18 and are condensed in condenser 7. The condensate therefrom flows through line 19 into decanter 8, where it separates into an upper $C_8$ linear mono-olefin-rich phase and a lower acetonitrile-rich phase. The mono-olefin-rich phase is withdrawn from the system through line 20 to receiver tank 9 and the lower acetonitrile layer is returned as reflux to column 6 through line 21. To maintain proper reflux on the column, a portion of the mono-olefin-rich phase may also be returned to the column through line 22. Inasmuch as acetonitrile content of the linear mono-olefin-rich phase contained in the receiver tank 9 may sometimes reach a content as high as about 5%, in such cases separation of the acetonitrile from the linear mono-olefin is desirable. Separation is suitably effected by water addition to the receiver tank 9 with subsequent two-phase formation of a substantially pure linear mono-olefin phase and an aqueous acetonitrile phase. These phases are separated in a known manner, e.g. decantation; the acetonitrile being recovered from the bottom phase for further use and the olefin phase being withdrawn to further processing, if desired.

The amount of acetonitrile in the column is limited to the extent that a separation between the acetonitrile-linear mono-olefin azeotropes from the feed mixture is effected in the lower trays, and the raffinate resulting from such separation, containing little or no acetonitrile, is removed through line 24 from the base of the column and collected in receiver tank 10. To compensate for minor losses of acetonitrile by partial solution in the upper layer of decanter 8, acetonitrile may be added intermittently from storage tank 2 through lines 17 and 16. In case of incomplete water removal in dehydrating still 3 a slow bleed of acetonitrile-water mixture can be taken from the lower layer of decanter 8 through line 23 to maintain anhydrous conditions in column 6.

As hereinbefore disclosed, the acetonitrile can also in some instances, depending on the olefinic impurities, be used as an aqueous azeotrope. Usage of this azeotrope would obviate the need of dehydrating still 3 in the figure and would permit the base of separation column 6 to operate at a lower temperature.

of the three runs along with the untreated feed is summarized in the following table.

TABLE I.—AZEOTROPIC DISTILLATION OF $C_8$ OLEFIN FRACTION WITH NITRILES

|  | $C_8$ Feed [1] | Run No. 1 | Run No. 2 | Run No. 3 |
|---|---|---|---|---|
| Nitrile |  | Aceto- | Propio- | iso-Butyro- |
| Boiling Point, °F |  | 179 | 207 | 219 |
| Vol./Vol. of Hydrocarbon |  | 1.7 | 1.0 | 3.0 |
| Azeotrope: |  |  |  |  |
| Boiling Point, °F |  | 171–172 | 199–201 | 213–214 |
| Hydrocarbon, Vol. percent |  | 40.4 | 43.6 | 40.1 |
| Octene Concentrate: |  |  |  |  |
| Vol. Percent of Feed [2] |  | 71–74 | 74 | 74 |
| Silica Gel Separation Anal.: |  |  |  |  |
| Mono-olefins: |  |  |  |  |
| Linear | 75.5 | 92.6 | 84.4 | [3] 86.1 |
| Cyclic | 7.3 | 3.9 | 7.3 | 4.7 |
| Diolefins: |  |  |  |  |
| Conjugated | 2.5 | 0.04 | 0.7 | 0.6 |
| Non-conjugated | 11.0 | 3.3 | 7.2 | 8.1 |
| Aromatics | 3.2 | 0.01 | 0.1 | 0.2 |
| Saturates | 0.5 | 0.2 | 0.3 | 0.3 |
| Olefins: |  |  |  |  |
| Type I | 93 | 94 | 93 | 94 |
| Type II$_t$ | 3 | 3 | 3 | 3 |
| Type III | 3 | 3 | 3 | 3 |
| Type IV | 1 | 0 | 1 | 0 |
| Carbon Number, Percent: |  |  |  |  |
| $C_7$ | 1.4 | 0.01 | 5.6 | 0.5 |
| $C_8$ | 92.4 | 99.97 | 93.9 | 99.5 |
| $C_9$ | 6.2 | 0.02 | 0.5 | Trace |
| $CH_3$/Mol | 1.11 | 1.09 | 1.11 | 1.07 |

[1] Average of three analyses.
[2] From refractive index and bromine number plots.
[3] Analysis of 73% of purified product recovered between 20 and 74% overhead.

The invention can also be applied to a batchwise technique. In this case, a mixture of the acetonitrile and the $C_8$ olefin feed mixture is charged to the kettle of a batch still. The overhead product from the column is condensed and the liquid phases separated in a decanter. The lower acetonitrile layer is returned to the column as reflux, together with sufficient upper layer to maintain proper reflux on the system. A stream from the upper layer, consisting essentially of $C_8$ linear mono-olefins, is also withdrawn to the product tank. When separation of the linear mono-olefin component by this method is essentially complete, the reflux and product system is changed so that all the upper layer is returned as reflux to the column and all the lower layer is withdrawn to a second product tank. When the acetonitrile has been stripped from the system in this manner, the still can be shut down and the kettle liquid consisting of raffinate can be pumped from the system. The acetonitrile entrainer, in the second product tank can then be returned to the system for reuse with the next batch.

The following specific examples will serve to further illustrate the present invention and are not to be construed as limiting the present invention.

Example I

In a series of three runs a $C_8$ olefin cut obtained in the stream cracking of petrolatum was mixed with acetonitrile (Run No. 1), propionitrile (Run No. 2), and isobutyronitrile (Run No. 3), and distilled at atmospheric pressure in a 1-inch, 40-plate Oldershaw column. The resulting distillate fractions, comprising the acetonitrile-octene azeotrope, were separated into hydrocarbon and nitrile phases. The former were water washed for refractive index, density, and bromine number determinations. Selected fractions were then combined for more complete determinations of the hydrocarbon components. A comparison of the resulting purified product for each From the above it is seen that a feed containing a total of 82.8% mono-olefins was upgraded to a total mono-olefin content of 96.5%, 91.7%, and 90.8% respectively.

Example II

In a manner similar to Example I, a $C_{10}$ olefin cut was mixed with acetonitrile (Run No. 1), and chloroacetonitrile (Run No. 2), and distilled at atmospheric pressure. The resulting fractions were analyzed also in a similar manner with the data being compared in the table below:

TABLE II.—AZEOTROPIC DISTILLATION OF A $C_{10}$ OLEFIN FRACTION WITH NITRILES

|  | $C_{10}$ Feed | Run No. 1 | Run No. 2 |
|---|---|---|---|
| Nitrile |  | Aceto- | Chloro-aceto- |
| Boiling Point, °F |  | 179 | 259 |
| Vol./Vol. of Hydrocarbon |  | 6.0 | 2.8 |
| Azeotrope: |  |  |  |
| Boiling Point, °F |  | 178–179 | 252–253 |
| Hydrocarbon, Vol. percent |  | 3.3 | 32.9 |
| Decene Concentrates: |  |  |  |
| Vol. Percent of Feed [1] |  | >28 | 74 |
| Silica Gel Separation Anal: |  |  |  |
| Mono-olefins: |  |  |  |
| Linear | 86.5 | 94.6 | 95.6 |
| Cyclic | 3.7 | 2.7 | 1.8 |
| Diolefins: |  |  |  |
| Conjugated | 0.3 | 0.2 | 0.01 |
| Non-conjugated | 5.6 | 1.4 | 2.3 |
| Aromatics | 3.5 | 0.3 | Trace |
| Saturates | 0.4 | 0.8 | 0.3 |
| Olefins: |  |  |  |
| Type I | 99 | 98 | 99 |
| Type II$_t$ | 1 | 1 | 1 |
| Type III | 0 | 1 | 0 |
| Type IV | 0 | 0 | 0 |
| Carbon No., Percent: |  |  |  |
| $C_9$ |  | 0.9 | Trace |
| $C_{10}$ | 94.7 | 94.4 | 96.8 |
| $C_{11}$ | 5.2 | 4.6 | 3.2 |
| $C_{12}$ | 0.1 |  |  |
| $CH_3$/Mol | 1.17 | 1.13 |  |

[1] From refractive index and bromine number plots.

Example III

In a manner similar to Examples I and II, a $C_7$ olefin cut was mixed with acetonitrile and distilled at atmospheric pressure. The resulting fractions were analyzed with the resulting data being compared in the table below:

TABLE III.—AZEOTROPIC DISTILLATION OF $C_7$ OLEFIN FRACTION WITH ACETONITRILE

|  | Feed | Azeotropic Distillation |
|---|---|---|
| Azeotrope: |  |  |
| Boiling Point, °F | | 156–160 |
| Hydrocarbon, Vol. percent | | 61.5 |
| Heptene Concentrate: | | |
| Vol. percent of Feed[1] | | 70 |
| Silica Gel Separation Analysis: | | |
| Mono-olefins: | | |
| Linear | 74.2 | 90.2 |
| Cyclic | 9.7 | 2.4 |
| Diolefins: | | |
| Conjugated | 1.8 | 0.1 |
| Non-conjugated | 11.0 | 6.8 |
| Aromatics | 2.8 | 0.1 |
| Saturates | 0.5 | 0.4 |
| Olefins: | | |
| Type I | 88 | 95 |
| Type II | 5 | 3 |
| Type III | 4 | 2 |
| Type IV | 3 | 0 |
| Carbon No., percent: | | |
| $C_6$ | Trace | 1.5 |
| $C_7$ | 87.7 | 98.4 |
| $C_8$ | 12.3 | 0.1 |
| $CH_3/Mol$ | 1.09 | 1.07 |

[1] From refractive index and bromine number plots.

In Examples II and III, as well as in Example I, the resultant increase in mono-olefin content as well as the corresponding decrease in the content of diolefins, aromatics and saturates is noteworthy.

Example IV

In order to determine the effectiveness of a ternary nitrile-water-linear olefine azeotrope in the purification method of the present invention, two distillations similar to that of Example I were made on a crude $C_8$ olefin cut. The entrainer employed in Run No. 1 was acetonitrile (B.P. 179° F.) and the entrainer of Run No. 2 was 82.6% acetonitrile—17.4% water (B.P. 169° F.). The boiling point of the azeotropes distilled in each run was determined as well as the composition of both layers of said distillate. The following tabulation summarizes hydrocarbon-entrainer distributions for the acetonitrile-octene azeotrope in comparison with the distribution for the ternary acetonitrile-water-ocetene azeotrope.

TABLE IV

|  | Run No. 1 | Run No. 2 |
|---|---|---|
| Azeotrope: | | |
| Boiling point, °F | 171–172 | 161 |
| Upper layer (vol. percent) | 28.9 | 44.7 |
| Percent hydrocarbon | 93.5 | 94.0 |
| Percent entrainer | 6.5 | 6.0 |
| Lower layer (vol. percent) | 71.1 | 55.3 |
| Percent hydrocarbon | 20.3 | 5.5 |
| Percent entrainer | 79.7 | 94.5 |
| Total azeotrope, percent hydrocarbon: | | |
| Upper layer | 27.0 | 42.0 |
| Lower layer | 14.4 | 3.0 |
| Total | 41.4 | 45.0 |

The ternary water-containing azeotrope of Run No. 2 has a lower boiling point and contained 3.6% more hydrocarbon than the acetonitrile-octene azeotrope. Also of significance is the decreased proportion of hydrocarbon in the nitrile layer (5.5%) obtained upon condensing the distillate, thereby resulting in a material more suitable for recycle in a continuous distillation. This system is particularly useful in purifying linear olefin fractions of low diolefin content. It will usually be preferred with diolefin-containing mixtures to employ an essentially anhydrous entrainer.

Example V

Succinonitrile and 3-hydroxypropionitrile were employed as entrainers for hexadecene-1 contained in a $C_{16}$ olefin fraction obtained in the steam cracking of petrolatum. Properties of these azeotropes are summarized in the following tabulation.

TABLE V

|  | Succinonitrile | 3-hydroxypropionitrile |
|---|---|---|
| Nitrile entrainer: boiling point (5 mm.), °F | 261 | 205 |
| Hexadecene-1: boiling point (5 mm.), °F | 266 | 266 |
| Azeotrope: | | |
| Boiling point (5 mm.), °F | 239 | 199 |
| Percent hydrocarbon | 69.8 | 35.5 |

Each of these azeotropes has a boiling point appreciably lower than the pure hydrocarbon (27° F. for succinonitrile and 67° F. for 3-hydroxypropionitrile) and each contains an attractive level of hydrocarbon, both qualities of practical entraining agents.

It is to be understood that the invention is not to be limited to the exact details of operations shown and described, as obvious modifications and equavalents will be apparent to one skilled in the art, and the invention is therefore to be limited only to the scope of the appended claims.

What is claimed is:

1. The method of separating linear aliphatic monoolefins from mixtures thereof with close boiling corresponding branched and cyclic mono-olefins, diolefins, and aromatics which comprises distilling said mixture with a nitrile of the general formula:

$$R(CN)_n$$

wherein $n$ is an integer of 1 to 2 and R is selected from the group consisting of $C_1$ to $C_4$ aliphatic hydrocarbon radicals and $C_1$ to $C_4$ aliphatic hydrocarbon radicals in which at least one hydrogen atom has been replaced by at least one substituent group containing an atom selected from the group consisting of oxygen, halogen and nitrogen, said nitrile being employed as an azeotrope entrainer, distilling off an azeotrope comprising a linear aliphatic monoolefin nitrile heterogenous azeotrope, and removing the linear aliphatic monoolefin fraction from said entrainer.

2. The method of claim 1 in which from 0.1 to 10 volumes of said nitrile are employed per volume of mixture.

3. The method of claim 1 in which water is used as an additional entrainer component with said nitrile.

4. The method of claim 1 in which the linear aliphatic monoolefin is a $C_6$–$C_{20}$ monoolefin.

5. The method of separating $C_6$–$C_8$ linear aliphatic monoolefins from mixtures thereof with corresponding branched and cyclic mono-olefins, diolefins, and aromatics which comprises distilling said mixture with a nitrile azeotrope entrainer of the general formula:

$$RCN$$

wherein R is a $C_1$–$C_4$ aliphatic hydrocarbon radical, distilling off an azeotrope comprising a $C_6$–$C_8$ linear monoolefin-nitrile heterogenous azeotrope and removing the $C_6$–$C_8$ linear monoolefin fraction from said entrainer.

6. The method of claim 5 in which from 0.2 to 4 volumes of said nitrile are employed per volume of mixture.

7. The method of separating $C_6$–$C_{20}$ linear aliphatic monoolefins from mixtures thereof with corresponding branched and cyclic mono-olefins, and aromatics which comprises distilling said mixture with an azeotrope entrainer consisting of water and a nitrile of the general formula:

$$R(CN)_n$$

wherein $n$ is 1 or 2, R is a $C_1$–$C_4$ aliphatic hydrocarbon radical, distilling off an azeotrope comprising a $C_6$–$C_{20}$ linear monoolefin-nitrile heterogenous azeotrope and removing the $C_6$–$C_{20}$ linear monoolefin fraction from said entrainer.

8. The method of separating $C_6$–$C_8$ linear aliphatic monoolefins from mixtures thereof with corresponding branched and cyclic mono-olefins, diolefins, and aromatics which comprises distilling said mixture with from 1 to 5 volumes of an acetonitrile azeotrope entrainer per volume of mixture, distilling off an azeotrope comprising a $C_6$–$C_8$ linear monoolefin-acetonitrile heterogenous azeotrope and removing the $C_6$–$C_8$ linear monoolefin fraction from said entrainer.

9. The method of separating $C_9$–$C_{12}$ linear aliphatic monoolefins from mixtures thereof with corresponding branched and cyclic mono-olefins, diolefins, and aromatics which comprises distilling said mixture with from 1 to 5 volumes of a chloroacetonitrile azeotrope entrainer per volume of mixture, distilling off an azeotrope comprising a $C_9$–$C_{12}$ linear monoolefin-chloroacetonitrile heterogenous azeotrope and removing the $C_9$–$C_{12}$ linear monoolefin fraction from said entrainer.

10. The method of separating $C_{12}$–$C_{20}$ linear aliphatic monoolefins from mixtures thereof with corresponding branched and cyclic mono-olefins, diolefins, and aromatics which comprises distilling said mixture with from 1 to 5 volumes of 3-hydroxypropionitrile azeotrope entrainer per volume of mixture, distilling off an azeotrope comprising a $C_{12}$–$C_{20}$ linear monoolefin-3-hydroxypropionitrile heterogenous azeotrope and removing the $C_{12}$–$C_{20}$ linear monoolefin fraction from said entrainer.

11. The method of separating $C_{16}$–$C_{20}$ linear aliphatic monoolefins from mixtures thereof with corresponding branched and cyclic mono-olefins, diolefins, and aromatics which comprises distilling said mixture with from 1 to 5 volumes of succinonitrile azeotrope entrainer per volume of mixture, distilling off an azeotrope comprising a $C_{16}$–$C_{20}$ linear monoolefin-succinonitrile heterogenous azeotrope and removing the $C_{16}$–$C_{20}$ linear monoolefin fraction from said entrainer.

References Cited by the Examiner

UNITED STATES PATENTS

| | | | |
|---|---|---|---|
| 2,679,472 | 5/1954 | Tooke | 203—60 |
| 2,842,484 | 7/1958 | Fleck | 203—60 |
| 2,848,387 | 8/1958 | Glazier et al. | 203—60 |
| 3,008,880 | 11/1961 | Dodge et al. | 203—60 |
| 3,087,866 | 4/1963 | Burch | 203—53 |

FOREIGN PATENTS 548,733   10/1942   Great Britain.

NORMAN YUDKOFF, *Primary Examiner.*

WILBUR L. BASCOMB, Jr., *Examiner.*